(12) United States Patent
Warwick

(10) Patent No.: US 6,363,257 B1
(45) Date of Patent: Mar. 26, 2002

(54) METHOD, APPARATUS, AND COMMUNICATION PROTOCOL FOR TRANSMITTING CONTROL DATA WITH AN IMPROVED ERROR CORRECTION CAPABILITY IN A DIGITAL CORDLESS TELEPHONE SYSTEM

(75) Inventor: Colin A. Warwick, Holmdel, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/245,078

(22) Filed: Feb. 5, 1999

(51) Int. Cl.7 .................................................. H04B 7/00
(52) U.S. Cl. ....................................... 455/511; 455/101
(58) Field of Search ................................ 455/511, 462, 455/464, 465, 517, 59, 101, 8, 9; 370/528

(56) References Cited

U.S. PATENT DOCUMENTS

| | | | | |
|---|---|---|---|---|
| 5,235,598 A | * | 8/1993 | Sasuta ......................... | 455/511 |
| 5,297,203 A | * | 3/1994 | Rose et al. .................. | 455/462 |
| 5,371,783 A | * | 12/1994 | Rose et al. .................. | 455/464 |
| 5,442,809 A | * | 8/1995 | Diaz et al. ................... | 455/511 |
| 5,781,540 A | * | 7/1998 | Malcolm et al. ............ | 455/12.1 |
| 5,873,038 A | * | 2/1999 | Guimont ...................... | 455/511 |

\* cited by examiner

Primary Examiner—William Trost
Assistant Examiner—Rafael Perez-Gutierrez
(74) Attorney, Agent, or Firm—William H. Bollman

(57) ABSTRACT

A more robust error correction capability is provided for the control data passed between a remote handset and its base unit in a DECT digital cordless telephone. According to the DECT standard as implemented in digital cordless telephones, one communication channel is used for control data and another is used for the voice data. While the DECT standard allows proprietary formats to be transmitted in the voice data channel, it fixes the information transmitted in the control data to ensure interoperability. In accordance with the principles of the present invention, the data rate of the voice data is reduced from a conventional 32 kb/s to provide bandwidth for error protection information. The error protection information may include, e.g., a redundant copy of the control data to provide the basis for a diversity scheme to improve the reliability of the control data transmission. Additionally, or alternatively, the error protection information may include error correction information, e.g., forward error correction information, relating to the control data and/or to the voice data to improve the reliability of the control data and/or voice data being transmitted. The error protection information may be combined with the voice data in the single communication channel time slot by, e.g., multiplexing, or apportioning of the time slot.

24 Claims, 8 Drawing Sheets

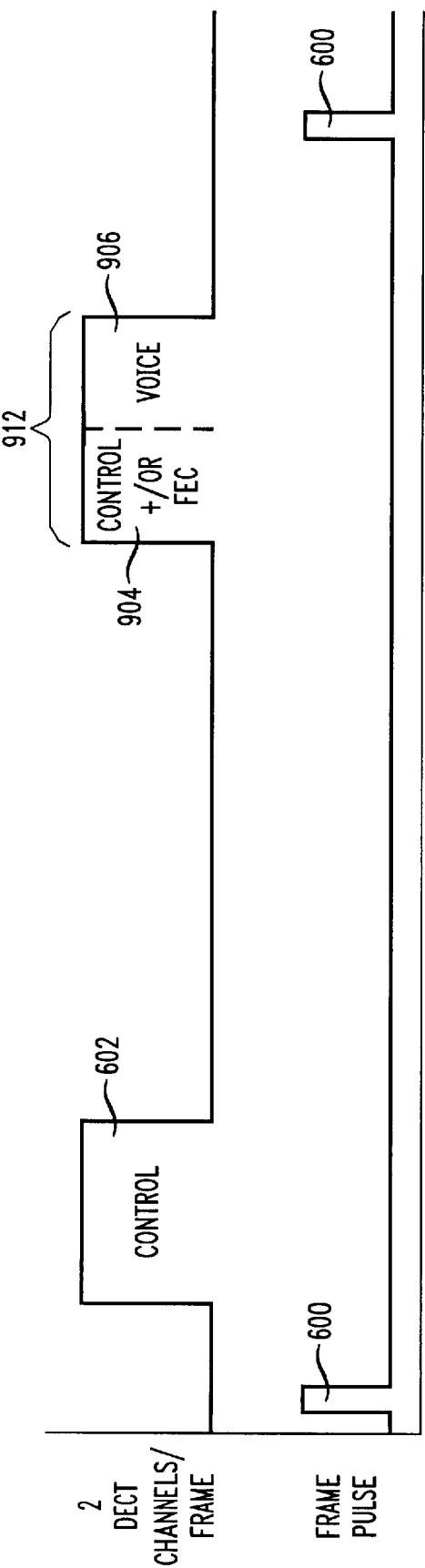

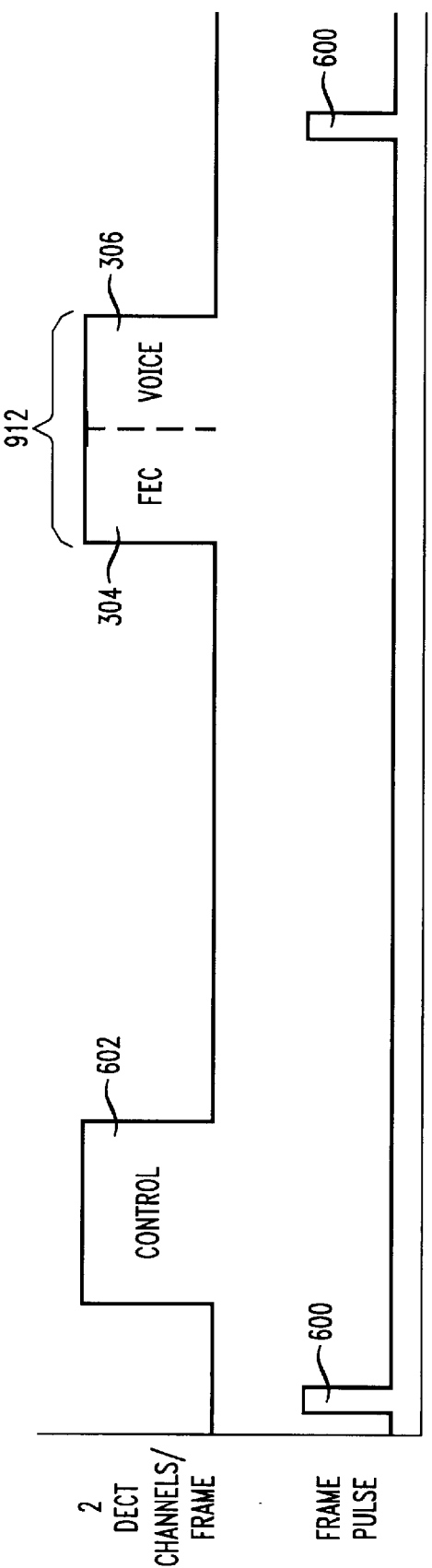

METHOD, APPARATUS, AND COMMUNICATION PROTOCOL FOR TRANSMITTING CONTROL DATA WITH AN IMPROVED ERROR CORRECTION CAPABILITY IN A DIGITAL CORDLESS TELEPHONE SYSTEM

BACKGROUND OF THE INVENTION

1. Field of the Invention

This invention relates generally to digital cordless telephones. More particularly, it relates to a digital communication technique providing increased range and/or voice quality capability within a two channel scheme, e.g., as defined by the DECT standard.

2. Background of Related Art

Cordless telephones have gained in popularity over the years, and can now be found in many if not most homes or businesses. A cordless telephone is one in which the handset is not wired to its base unit, but instead uses wireless communication techniques between a remote handset and its base unit, typically allowing the remote handset to be used up to 1000 feet or more away from its base unit.

Initially, wireless communications between an analog remote handset 502a and its base unit 504a communicated an underlying voice signal in an analog form, as depicted in FIG. 3A. However, the quality of the voice signal in an analog cordless telephone tends to degrade as the distance between the remote handset and its base unit increases, and/or as environmental conditions worsen. Unfortunately, particularly in analog systems, any degradation in the voice signal is perceived and heard by the user of the analog cordless telephone, potentially causing uncomfortable sounds to the user.

Later, digital communication techniques were implemented in the communication path between a digital remote handset 502b and its base unit 504b of a cordless telephone as depicted in FIG. 3B. These cordless telephones are commonly known as digital cordless telephones. The digital communication techniques greatly improved the quality of voice communications using cordless telephones, particularly when the remote handset is used at a distance from its base unit, and/or in the presence of undesirable environmental conditions. In a digital cordless system, incremental degradation in the received signal does not affect the perceived voice quality, and occasional errors in voice data can be corrected using conventional error correction techniques. Thus, a user is provided with consistent quality voice communications generally for the entire range of operation, with environmental conditions potentially decreasing the range of operation of the digital cordless telephone.

Digital cordless telephones present the best opportunities for the future, and continue to be improved and standardized. For instance, digital cordless telephones have more recently begun to adopt a wireless digital communication standard known as the Digital Enhanced Cordless Telecommunications (DECT) for the communication of voice data between a DECT digital remote handset 502c and its base unit 504c, as shown in FIG. 3C.

The DECT standard has been in development by the European Telecommunications Standard Institute (ETSI) since the late 1980's. Initially, the DECT standard was adopted for use in more complex products such as cordless private automatic branch exchange (PABX) systems. However, today the DECT standard is used to address the needs of a much higher volume market with, e.g., cordless telephones.

The DECT standard can be used to provide wireless access in both indoor and outdoor environments, with cell radii ranging from 50 to several hundred meters. Hence, the DECT standard has been found to be suitable for the development of residential, business and public applications.

The DECT standard is an access system, without any specific (defined) backbone network. As such it relies to a large extent on the backbone network(s) it is attached to. The DECT standard requires an adaptation to a backbone system, and this "adaptation" preferably does not form a bottleneck.

Many backbone networks for DECT specific internetworking standards have been developed, e.g. ISDN and GSM. The DECT standard is capable of offering services with these networks, and essentially can be considered to become a part of the backbone network into which it is adapted. Consequently, the DECT standard is no longer just a simple extension of the backbone network in which it is implemented, but rather enhances the services and capabilities of its backbone network.

The interworkings of the DECT standard with many kinds of backbone networks are specified in the DECT standard. Applications defined in the DECT data services profiles include, e.g., Ethernet and Token Ring LANs, TCP/IP, MANs, Modems, RS-232, X.25, Real-Time Video, ATM, Multimedia, Paging, Telemetry, Fax, E-mail, WWW, and X.400.

The general characteristics of the DECT standard include a frequency range of 1.88–1.90 GHz, a carrier spacing of 1.728 MHz, peak transmit power of 250 mW, and 2×12 channels/carrier. The DECT standard specifies, a duplex method of TDD using 2 slots on the same RF carrier. The communication channels may utilize time division multiple access (TDMA) or frequency division multiple access (FDMA) techniques. Up to 120 duplex channels may be implemented. The specified frame length is 10 milliseconds (mS), the specified speech coding is 32 kbits/s (kb/s) using adaptive differential pulse code modulation (ADPCM) techniques. The specified modulation is Gaussian Frequency Shift Keying (GFSK), and the specified gross data rate is 1.152 Mbit/s.

The conventional implementation of the DECT standard for use in conventional cordless telephones is shown in FIG. 4.

In FIG. 4, the DECT standard includes a physical layer (PHY) 202, a medium access control (MAC) layer 204, a data link control (DLC) layer 206, a network (NWK) layer 208, a user data layer 210, and an application (i.e., control data) layer 212. The general descriptions of each of these layers is as follows.

The physical layer (PHY) 202 typically specifies radio parameters such as frequency, timing and power values, bit and slot synchronization, and transmitter and receiver performance data. FIG. 5 shows the frame structure of the time division multiple access/time duplex (TDMA/TDD) transmission scheme defined by the DECT standard. In general, in each direction in the wireless communication link of a DECT digital cordless telephone, one (1) timeslot is utilized to transmit voice data, and one (1) timeslot is utilized to transmit control data.

Referring again to FIG. 4, the medium access control (MAC) layer 204 is specified in three groups of MAC services. These are the broadcast message control service, the connectionless message control service, and the multibearer control service. The medium access control (MAC) layer 204 also specifies the logical channels, which are used by the above mentioned services, and how they are multiplexed and mapped on to the physical channels.

The data link control (DLC) layer 206 specifies whether or not the DLC service operates in acknowledged or unacknowledged mode. The data link control (DLC) layer 206 is also defined to include the provision of addressing, frame delimiting, error control, flow control, segmentation of network layer information fields, fragmentation of DLC frames, and connection handover.

In the user data layer 210, the transparent unprotected service, the frame relay service, the frame switching service, and the rate adaption service are defined.

The network (NWK) layer 208 specifies functions for the link control, call control, supplementary services, connection oriented message services, and mobility management. The network (NWK) layer 208 includes procedures, messages, and information elements for each of these groups.

The application layer 212 includes control data relating to the specific application. For instance, the application layer 212 may include the type speech coding and the necessary functions to provide real-time two-way speech conversation. It defines the speech encoding algorithm and the detailed speech performance characteristics such as sensitivity, frequency response, sidetone, terminal coupling loss, distortion of gain with input level, out of band signals, noise, acoustic shock, delay, and network echo control.

The DECT standard also outlines that a 3.1 KHz telephony teleservice conveyed over a DECT link (including FP and PP) which is capable of being connected (directly or indirectly) to the public network access point shall comply with the requirements in Part 7. However, tethered, fixed point local loop applications are not required to comply with the requirements of the Part 7 standard (e.g., the communications between a remote handset and its base unit in a digital cordless telephone). The DECT standard provides that DECT implementations capable of voice transmission that are not required to comply with the Part 7 standard shall not use more than 20% of the available physical channels for connections that use more than one full slot duplex bearer (i.e., not more than two (2) channels in either direction between the remote handset and its base unit).

FIG. 5 shows the frame structure of the time division multiple access/time duplex (TDMA/TDD) transmission scheme defined by the DECT standard.

FIG. 6 depicts half of the channels used by one DECT digital cordless telephone, i.e., either the two channels used to transmit information from the remote handset to the base unit, or the two channels used to transmit information from the base unit to the remote handset.

As depicted in FIG. 6, within each frame defined by, e.g., a frame pulse 600, one transmission channel contains control data 602 and another transmission channel contains voice data 604.

Various countries, including the TIA in the United States, have adopted a modified version of the DECT standard (e.g., the PWT standard). According to these implementations of the DECT standard, the control data transmitted in the application layer 212 is defined to be sent using error correction techniques provided using a cyclic redundancy check (CRC).

Unfortunately, as a remote handset reaches the full extent of its communication capabilities and the communication signal becomes weak, (e.g., at the end of its usable range in the so-called end of range condition), noise and/or interference often degrade the voice quality of the connection between the remote handset and its base unit. Moreover, if using only CRC checking techniques to correct errors in the control channel, particularly when the digital cordless telephone is in an end of range condition, uncorrectable errors may nevertheless occur in the control data transmitted in the application layer 212. These errors in the control information passed between the remote handset and its base unit may cause serious problems, including the possibility of leading to a dropped call.

Accordingly, there is a need for a more reliable technique for communicating control data between a remote handset and its base unit in a digital cordless telephone utilizing the DECT standard, particularly when the digital cordless telephone is in an end of range condition.

SUMMARY OF THE INVENTION

In accordance with the principles of the present invention, a digital wireless communication protocol for use with cordless telephones comprises a control data channel adapted to contain control data relating to a use of a digital cordless telephone. A voice data channel is adapted to contain voice data relating to a conversation using the digital cordless telephone as well as a redundant copy of at least a portion of the control data.

A method of providing diversity for control data in a two channel system including voice data in accordance with another aspect of the present invention comprises communicating the control data in a first one of two communication channels, and communicating encoding voice data in a portion of a second one of the two communication channels. A redundant copy of the control data is combined in a remaining portion of the second one of the two communication channels.

BRIEF DESCRIPTION OF THE DRAWINGS

Features and advantages of the present invention will become apparent to those skilled in the art from the following description with reference to the drawings, in which:

FIGS. 2A to 2C show various exemplary embodiments of the inclusion of a redundant transmission of control information and/or error correction information together with voice data in the otherwise conventional voice data channel, e.g., of the DECT standard, in accordance with the principles of the present invention.

DETAILED DESCRIPTION OF ILLUSTRATIVE EMBODIMENTS

Figure 1:
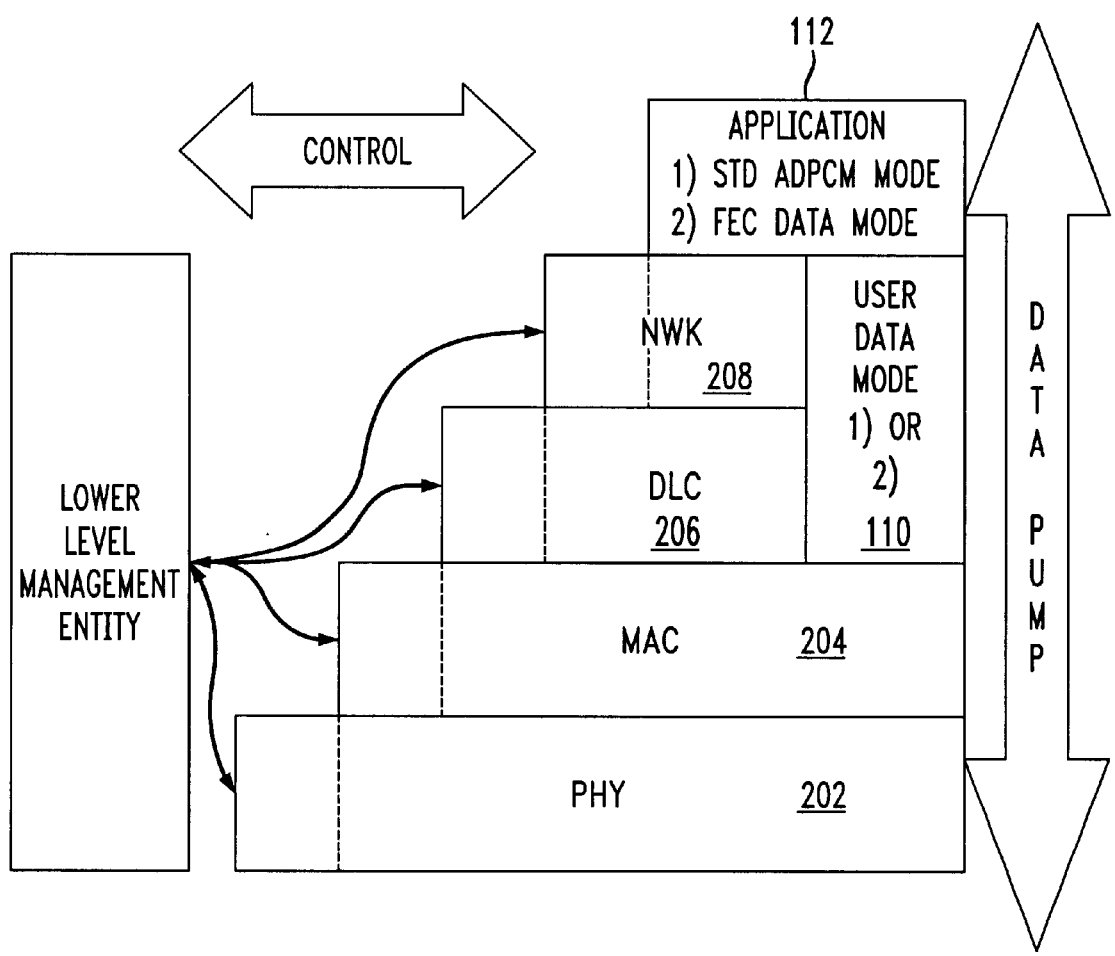
FIG. 1 shows an implementation of the DECT standard in a conventional cordless telephone constructed in accordance with the principles of the present invention.

The present invention provides a reliable technique for communicating control data between a remote handset and its base unit in a digital cordless telephone utilizing, e.g., the DECT standard, particularly when the digital cordless telephone is in an end of range condition. In accordance with the principles of the present invention, a redundant copy of control data is transmitted to provide a diversity scheme, and/or more robust error correction protocols are implemented and communicated, in the user data plane of the OSI model of the DECT standard (i.e., the voice data channel), either for the duration of a telephone call, or as certain conditions dictate (e.g., during an end of range condition).

The DECT standard allows for proprietary data formats to be used for voice data transmission in the data plane. In accordance with the principles of the present invention, in addition to the voice data, a redundant copy of control data and/or robust error correction regarding the voice data and/or control data is included, at least when certain conditions exist, to augment and improve the overall quality of the wireless communication link within the definitions set forth in the developing DECT standard.

When the robust error correction and/or control data diversity scheme is implemented in the voice data transmission channel in transmissions originating in both the remote handset and the base unit of a DECT digital cordless telephone, the inventive error protected mode can be established, e.g., as a default mode entered during a registration sequence when the remote handset is initially activated, or on-the-fly during a telephone call when the communication channel has degraded, e.g., when in an end of range condition.

Preferably, both the control data and the voice data are protected by error protection schemes in accordance with the principles of the present invention. However, the present invention is nevertheless applicable to added error protection of only the control channel (e.g., using diversity) beyond that already provided for by the DECT standard. Added reliability in the control data will accordingly reduce the vulnerability to, e.g., dropped telephone calls due to the loss of control data information.

The DECT standard conventionally allows flexibility for manufacturers to continue to utilize proprietary data streams for transmitting voice data between a remote handset and its base unit in a digital cordless telephone, but fixes the control data format to ensure interoperability. The principles of the present invention work within this framework, yet augment this limitation by a) allowing the continued transmission of unprotected control data in the appropriately designated DECT control channel, and by b) providing additional error protection for the control channel, either using a diversity scheme with a redundant transmission of control data, and/or by providing error correction for the control data (and even for the voice data) over the voice data channel.

When transmitted over the voice data channel, the control data may be, e.g., interleaved, multiplexed, or otherwise combined with the voice data to fit into the single designated voice data channel.

A reverse process is applied at the receiving end, with the conventionally transmitted control data (transmitted over the control channel) being merged with the error protected redundant control data transmitted over the voice data channel, using any suitable conventional diversity combining method.

The combination of both error correction information and/or redundant control data would require the net bit rate being transmitted over the single voice data channel imposed by the DECT standard to increase. Thus, in accordance with the principles of the present invention, the per channel bit rate of the voice data is preferably reduced to allow the added information, e.g., the error correction information and/or the redundant control data, to fit within the capabilities of the assigned DECT transmission channel For example, a double slot mode allowed by the DECT standard may be implemented. This will provide a higher voice quality, but require the transmitters and receivers to be powered on for a larger portion of the DECT data frame, causing the consumption of approximately twice the amount of valuable resources such as battery power and spectrum allocation.

As another example, the voice data can be compressed to a lower data rate than that provided in a standard mode for the DECT voice data channel. For example, a GSM Enhanced Full Rate ("EFR") algorithm provides excellent voice quality at 13 kb/s, albeit at the expense of increased signal processing complexity. The difference between the otherwise standard 32 kb/s ADPCM compressed voice data and the replacement higher-compressed voice data, e.g., at a 13 kb/s rate provided by an EFR algorithm, can preferably be allocated for use by the redundant transmission of control data and/or error correction information, in accordance with the principles of the present invention.

FIG. 1 shows an implementation of an optional mode of operation including forward error correction information and/or redundant control data in the user plane 110, as determined in an application layer 112.

In particular, the principles of the present invention can be implemented only as necessary, e.g., as an out of range condition and/or other deteriorated communications are encountered by a DECT digital cordless telephone. For instance, the application (i.e., the digital cordless telephone functions) may initialize and proceed in a conventional fashion indicated by mode 1) in the application layer 112 and in the user data plane 110 by including just the ADPCM encoded voice data in the voice data channel. Then, as deteriorated conditions warrant, the error protected mode 2) shown in the application layer 112 and in the user data plane 110 can be entered in accordance with the principles of the present invention.

The redundant control data and/or error correction information 904 for the control data and/or the voice data can be combined with the voice data 906 in any suitable fashion.

For instance, FIG. 2A shows a portion of the bits in the voice data channel time slot 912 assigned for use by the redundant control data and/or error correction information 904 for the control data and/or the voice data, and another portion of the bits in the voice data channel time slot 912 assigned for use by the voice data 906. This apportionment of the time slot can be fixed for the duration of the error protected mode, or can vary as necessary to provide increased or decreased error protection.

FIG. 2B shows a portion of the bits in the voice data channel time slot 912 used for forward error correction information only. In this scenario, redundant control data may or may not be included, and the error correction information may relate to the control data and/or to the voice data.

Figure 2C:
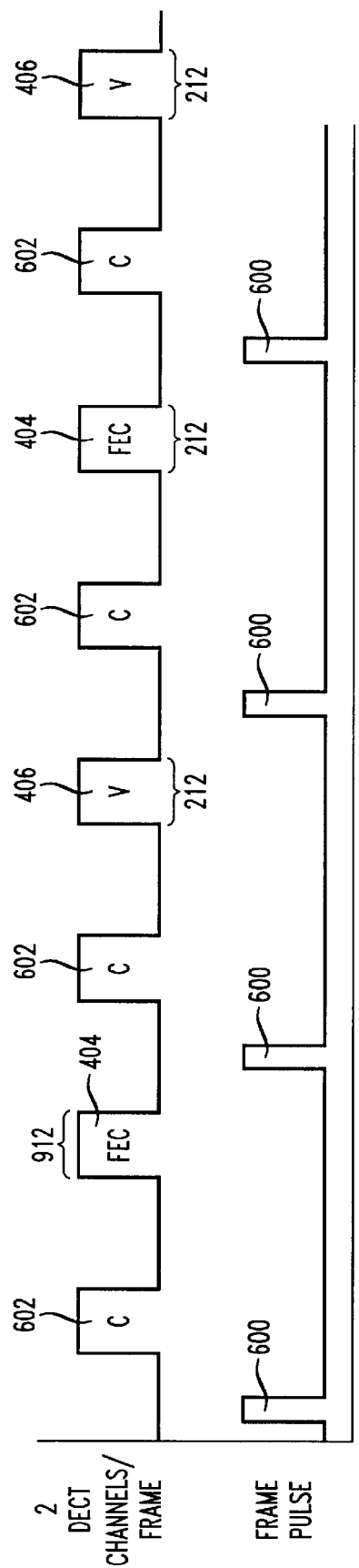
Figure 3A:
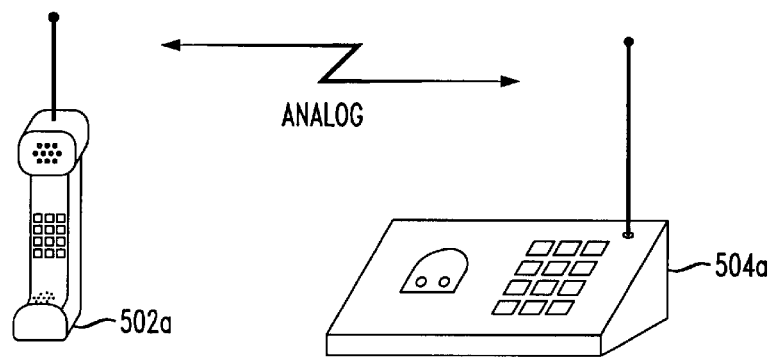
FIGS. 3A to 3C show conventional communication techniques between a remote handset and its respective base unit.
Figure 3B:
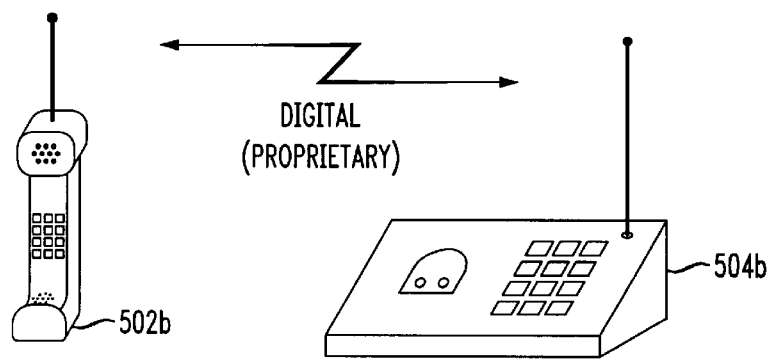
Figure 3C:
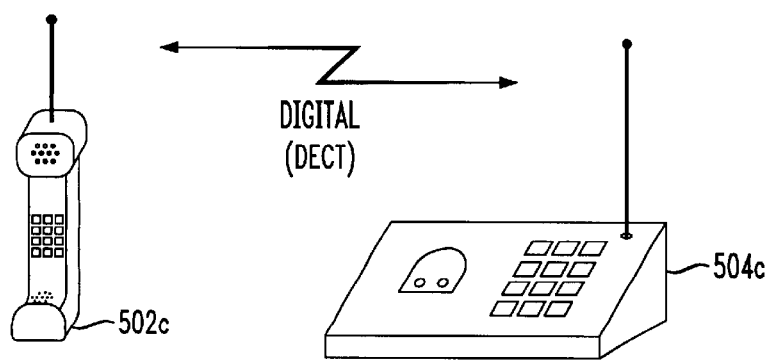
Figure 4:
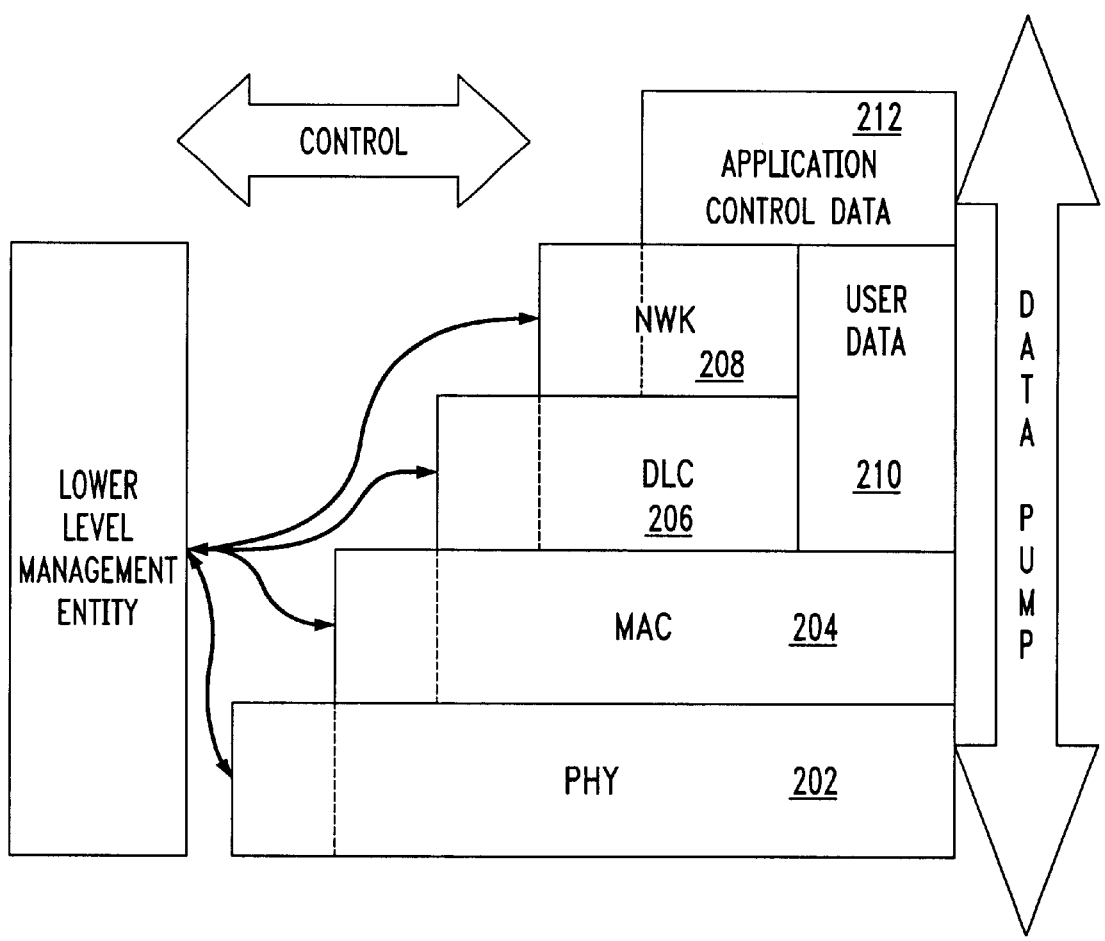
FIG. 4 shows a conventional implementation of the DECT standard for use in conventional cordless telephones.
Figure 5:
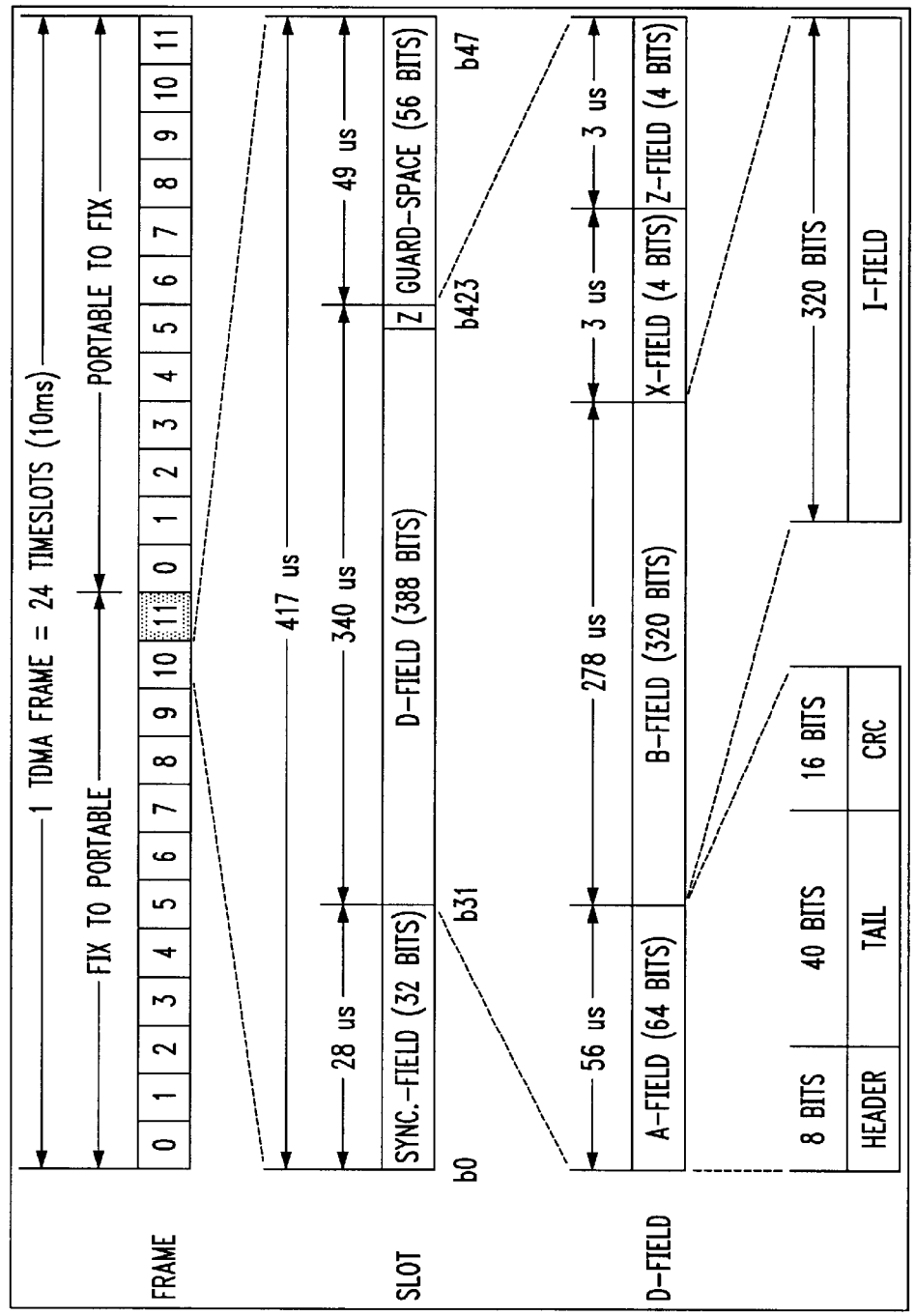
FIG. 5 shows the frame structure of the time division multiple access/time duplex (TDMA/TDD) transmission scheme defined by the DECT standard.
Figure 6:
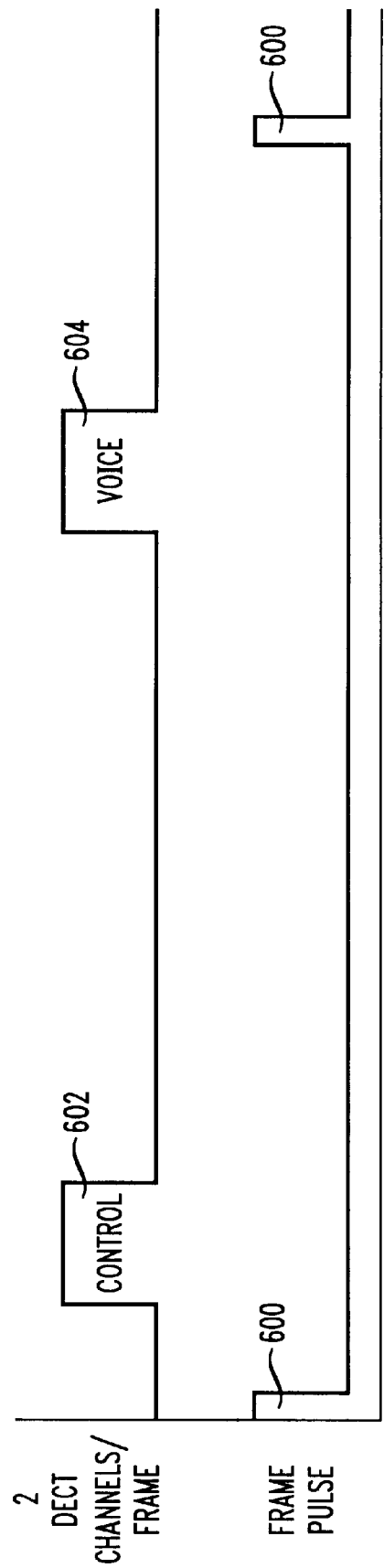
FIG. 6 depicts the conventional use of two transmission channels by a DECT digital cordless telephone.

FIG. 2C shows a multiplexing of forward error correction information in the voice data channel, e.g., every other frame, with the voice data occurring in the alternating frames of the voice data channel. This scenario reduces the available bit rate to 16 kb/s for the voice data, but provides up to 16 kb/s of bandwidth for use by, e.g., forward error correction information for the control data and/or voice data, and/or a redundant copy of some or all of the control data to provide the basis for a diversity scheme with respect to the control data.

Any conventional forward error correction algorithm may be implemented to provide a more robust error correction capability for either the control data and/or the voice data, in accordance with the principles of the present invention. Some exemplary forward correction algorithms which may be implemented include, but are not limited to, block codes (such as Hamming, cyclic, BCH, and Reed-Solomon methods), convolutional codes, and turbo codes.

Complimentary decoding algorithms would then be implemented in the receiver to decode the forward error correction information. For example, if a convolutional code is used in the transmitter, a complimentary Viterbi algorithm decoder may be used in the receiver. Error correction codes are often more effective when used in combination with each other (for example, the concatenation of a convolution and Reed-Solomon code) and/or with interleaving.

Accordingly, increased range and/or voice quality can be achieved within the framework of, e.g., the DECT standard by adding the transmission of robust error correction techniques regarding the control data and/or the voice data, in accordance with the principles of the present invention.

The principles of the present invention are applicable to devices other than digital cordless telephones. For instance, a robust control data error correction scheme can be implemented for transmission in the data plane in, e.g., cable TV communications, satellite TV communications, and digital broadcast TV communications.

While the invention has been described with reference to the exemplary embodiments thereof, those skilled in the art will be able to make various modifications to the described embodiments of the invention without departing from the true spirit and scope of the invention.

What is claimed is:

1. Apparatus for providing diversity for control data in a two channel system including voice data, comprising:
   means for communicating said control data in a first one of two communication channels;
   means for communicating encoding voice data in a portion of a second one of said two communication channels; and
   means for combining a redundant copy of said control data in a remaining portion of said second one of said two communication channels.

2. The apparatus for providing diversity for control data in a two channel system including voice data according to claim 1, further comprising:
   means for re-combining said control data with said redundant copy of said control data at a receiving end of said two channel system to resolve any errors which may have occurred in a communication of said control data.

3. The apparatus for providing diversity for control data in a two channel system including voice data according to claim 1, wherein said means for combining includes:
   means for multiplexing said voice data with said redundant copy of said control data into alternating frames of said second one of said two communication channels.

4. The apparatus for providing diversity for control data in a two channel system including voice data according to claim 1, wherein said means for combining comprises:
   means for multiplexing said voice data with said redundant copy of said control data into each frame of said second one of said two communication channels.

5. The apparatus for providing diversity for control data in a two channel system including voice data according to claim 1, wherein:
   said control data is adapted to provide control information between a remote handset and a base unit in a digital cordless telephone.

6. The apparatus for providing diversity for control data in a two channel system including voice data according to claim 5, wherein:
   said digital cordless telephone conforms to a DECT standard for digital cordless telephones.

7. A method of providing diversity for control data in a two channel system including voice data, said method comprising:
   communicating said control data in a first one of two communication channels;
   communicating encoded voice data in a portion of a second one of said two communication channels; and
   combining a redundant copy of said control data in a remaining portion of said second one of said two communication channels.

8. The method of providing diversity for control data in a two channel system including voice data according to claim 7, further comprising:
   recombining said control data with said redundant copy of said control data at a receiving end of said two channel system to resolve any errors which may have occurred in a communication of said control data.

9. The method of providing diversity for control data in a two channel system including voice data according to claim 7, wherein:
   said combining includes a multiplexing of said voice data with said redundant copy of said control data into alternating frames of said second one of said two communication channels.

10. The method of providing diversity for control data in a two channel system including voice data according to claim 7, wherein:
    said combining includes a multiplexing of said voice data with said redundant copy of said control data into each frame of said second one of said two communication channels.

11. The method of providing diversity for control data in a two channel system including voice data according to claim 7, wherein:
    said control data is utilized to provide control information between a remote handset and a base unit in a digital cordless telephone.

12. The method of providing diversity for control data in a two channel system including voice data according to claim 11, wherein:
    said digital cordless telephone conforms to a DECT standard for digital cordless telephones.

13. A digital wireless communication protocol for use with cordless telephones, comprising:
    a control data channel adapted to contain control data relating to a use of a digital cordless telephone; and
    a voice data channel adapted to contain voice data relating to a conversation using said digital cordless telephone as well as a redundant copy of at least a portion of said control data.

14. The digital wireless communication protocol for use with cordless telephones according to claim 13, wherein:
    said redundant copy of said at least said portion of said control data is adapted to provide diversity in a receiver with respect to said control data.

15. The digital wireless communication protocol for use with cordless telephones according to claim 13, wherein:

said digital wireless communication protocol utilizes no more than two time slots in a TDMA multi-channel communication scheme.

16. The digital wireless communication protocol for use with cordless telephones according to claim 15, wherein:

said TDMA multi-channel scheme provides for at least 24 channels.

17. The digital wireless communication protocol for use with cordless telephones according to claim 13, wherein said voice data channel further comprises:

error correction information relating to said control data.

18. The digital wireless communication protocol for use with cordless telephones according to claim 17, wherein said voice data channel further comprises:

error correction information relating to said voice data.

19. The digital wireless communication protocol for use with cordless telephones according to claim 17, wherein:

said error correction information includes forward error correction information.

20. The digital wireless communication protocol for use with cordless telephones according to claim 13, wherein said voice data channel further comprises:

error correction information relating to said voice data.

21. The digital wireless communication protocol for use with cordless telephones according to claim 20, wherein:

said error correction information includes forward error correction information.

22. The digital wireless communication protocol for use with cordless telephones according to claim 13, wherein:

said digital wireless communication protocol conforms substantially to a DECT standard for digital cordless telephones.

23. The digital wireless communication protocol for use with cordless telephones according to claim 13, wherein:

said voice data has a data rate of no greater than 13 kb/s.

24. The digital wireless communication protocol for use with cordless telephones according to claim 13, wherein:

said voice data has a data rate of less than 32 kb/s.

* * * * *